(12) United States Patent
Spichtinger et al.

(10) Patent No.: US 8,092,124 B2
(45) Date of Patent: Jan. 10, 2012

(54) MILLING CUTTER

(75) Inventors: Xaver Spichtinger, Oberviechtach (DE); Heinrich Manner, Guteneck (DE)

(73) Assignee: Kennametal Inc., Latrobe, PA (US)

( * ) Notice: Subject to any disclaimer, the term of this patent is extended or adjusted under 35 U.S.C. 154(b) by 1215 days.

(21) Appl. No.: 11/563,070

(22) Filed: Nov. 24, 2006

(65) Prior Publication Data

US 2007/0127992 A1    Jun. 7, 2007

Related U.S. Application Data

(63) Continuation-in-part of application No. PCT/EP2005/002351, filed on Mar. 5, 2005.

(30) Foreign Application Priority Data

May 27, 2004    (DE) .................... 20 2004 008 642 U

(51) Int. Cl.
*B23C 5/24*    (2006.01)
*B23C 5/28*    (2006.01)

(52) U.S. Cl. ................. 407/39; 407/46; 407/11; 407/38

(58) Field of Classification Search .............. 407/33–39, 407/40–44, 46–51, 11, 101
See application file for complete search history.

(56) References Cited

U.S. PATENT DOCUMENTS

| | | | |
|---|---|---|---|
| 650,013 A | 5/1900 | Huther | |
| 1,049,589 A | 1/1913 | Mitchell | |
| 1,484,207 A | 2/1924 | Campbell | |
| 1,836,737 A * | 12/1931 | Walker | 407/41 |
| 2,903,784 A * | 9/1959 | Billman | 407/38 |
| 3,058,198 A | 10/1962 | Williams | |
| 3,079,671 A | 3/1963 | Payne | |
| 3,195,376 A * | 7/1965 | Bader | 408/146 |
| 3,214,825 A | 11/1965 | Williams | |
| 3,270,396 A | 9/1966 | Williams | |
| 3,339,257 A * | 9/1967 | Hargreaves et al. | 407/38 |
| 3,469,296 A * | 9/1969 | Reeve et al. | 407/105 |
| 3,792,517 A | 2/1974 | Gage | |
| 3,802,043 A * | 4/1974 | Garih | 407/36 |
| 3,946,475 A * | 3/1976 | Hopkins | 407/41 |
| 4,040,156 A | 8/1977 | Tack | |
| 4,097,174 A | 6/1978 | Heinlein | |

(Continued)

FOREIGN PATENT DOCUMENTS

DE    25 05 515    8/1975

(Continued)

OTHER PUBLICATIONS

International Search Report PCT/EP2005/002351 and English translation thereof.

(Continued)

*Primary Examiner* — Boyer D Ashley
*Assistant Examiner* — Sara Addisu
(74) *Attorney, Agent, or Firm* — Larry R. Meenan

(57) ABSTRACT

A milling cutter for machining work pieces, which comprises at least one cutting insert that can be adjusted by an adjusting element. The adjusting element is a one-piece element having an adjusting cone that extends between a screw head and a threaded shank. The adjusting cone engages with a recess provided in a lateral face of the cutting insert, which recess may also have a conical shape which substantially corresponds to the conical shape of the adjusting cone.

14 Claims, 5 Drawing Sheets

U.S. PATENT DOCUMENTS

| | | | |
|---|---|---|---|
| 4,344,724 A * | 8/1982 | Kress et al. | 407/36 |
| 4,547,100 A | 10/1985 | Naccarato et al. | |
| 4,708,536 A * | 11/1987 | Sullivan | 407/41 |
| 4,714,384 A * | 12/1987 | Lagerberg | 407/103 |
| 4,927,301 A * | 5/1990 | Reiterman | 408/180 |
| 4,975,002 A * | 12/1990 | Kress et al. | 408/224 |
| 5,209,610 A * | 5/1993 | Arai et al. | 407/36 |
| 5,516,241 A | 5/1996 | Plutschuck et al. | |
| 5,567,092 A * | 10/1996 | Post | 407/38 |
| 5,733,073 A * | 3/1998 | Zitzlaff et al. | 407/107 |
| 5,833,403 A | 11/1998 | Barazani | |
| 5,913,643 A * | 6/1999 | Fowler et al. | 407/36 |
| 6,056,484 A | 5/2000 | Mitchell et al. | |
| 6,155,753 A | 12/2000 | Chang | |
| 6,511,264 B2 * | 1/2003 | Ripley | 407/36 |
| 6,655,879 B2 * | 12/2003 | Grehn | 407/44 |
| 6,739,807 B2 | 5/2004 | Robinson et al. | |
| 6,789,983 B2 * | 9/2004 | Mizutani | 407/46 |
| 6,942,432 B2 | 9/2005 | Noggle | |
| 6,971,823 B2 | 12/2005 | Satran et al. | |
| 7,029,210 B2 * | 4/2006 | Schlagenhauf | 408/153 |
| 7,156,588 B2 | 1/2007 | Elbaz et al. | |
| 7,163,360 B2 * | 1/2007 | Toyose | 407/36 |
| 7,300,231 B1 | 11/2007 | Liu | |
| 7,578,640 B2 * | 8/2009 | Hecht | 407/103 |
| 2002/0106251 A1 | 8/2002 | Ripley | |
| 2003/0031518 A1 * | 2/2003 | Hellstrom et al. | 407/102 |
| 2005/0254907 A1 * | 11/2005 | Bader et al. | 407/36 |
| 2006/0140730 A1 * | 6/2006 | Schlagenhauf et al. | 407/37 |
| 2007/0127992 A1 | 6/2007 | Spichtinger et al. | |
| 2008/0080937 A1 * | 4/2008 | Hecht | 407/42 |
| 2008/0232910 A1 * | 9/2008 | Hecht | 407/39 |

FOREIGN PATENT DOCUMENTS

| | | |
|---|---|---|
| DE | 9016048.7 | 2/1992 |
| DE | 4416380 A1 * | 11/1995 |
| DE | 102 51922 A1 | 6/2003 |
| EP | 1 129 806 | 9/2001 |
| EP | 1 213 081 | 6/2002 |
| JP | 08039325 A * | 2/1996 |
| JP | 20 01150218 | 6/2001 |
| JP | 2001150218 A * | 6/2001 |
| WO | 2004/018133 A1 | 3/2004 |
| WO | WO 2004018133 A1 * | 3/2004 |

OTHER PUBLICATIONS

German Search Report 20 2004 008 642.5.
International Preliminary Report on Patentability PCT/EP2005/002351 and English translation thereof.

* cited by examiner

MILLING CUTTER

CONTINUING APPLICATION DATA

This application is a Continuation-In-Part application of International Patent Application No. PCT/EP2005/002351, filed on Mar. 5, 2005, which claims priority from Federal Republic of Germany Patent Application No. 20 2004 008 642.5, filed on May 27, 2004. International Patent Application No. PCT/EP2005/002351 was pending as of the filing date of this application. The United States was an elected state in International Patent Application No. PCT/EP2005/002351.

BACKGROUND

1. Technical Field

The present application relates to a milling cutter, such as a surface milling cutter, for machining workpieces with at least one cutting insert which can be fixed in a recess of the tool base and adjusted by means of an adjusting element.

2. Background Information

Such a milling cutter is known, for example, from U.S. Pat. No. 3,339,257, in which a number of adjustable cutting inserts are arranged and distributed on the circumference of a tool base of substantially cylindrical shape. The setting or adjustment of the cutting inserts is effected by means of a two-piece adjusting device, consisting of a sleeve-shaped adjusting wedge inserted into an adaptor hole of the tool base and having an internal thread, as well as an internal screw which can be screwed together with said adjusting wedge as well as with an internal thread of the adaptor hole. By means of the internal screw, the adjusting wedge of this two-piece adjusting element is displaced along a lateral face of a cutting tip or a cutting blade in radial direction, so that, consequently, the cutting tip is displaced in an axial direction. Such a two-piece design of an adjusting device with a sleeve-shaped adjusting wedge and a set screw guided therein is also known in the tool for metal-cutting fine machining of workpieces known from European Patent No. 1 213 081 B1.

An adjusting device for a cutting tip of a cutting tool with a one-piece set screw is known from U.S. Pat. No. 6,155,753. In this known adjusting device, a centric or eccentric screw head of the set screw is displaced in radial direction along a conically extending lateral face of the cutting tip, so that, consequently, the cutting tip is displaced in an axial direction.

OBJECT OR OBJECTS

The object of at least one possible embodiment of the present application is to provide a milling cutter, such as a surface milling cutter having a simplified structure, which enables an essentially secure setting or adjustment of the cutting insert, or of each cutting insert, with essentially the simplest means as reasonably possible.

SUMMARY

The object of the present application may be accomplished in at least one possible embodiment of a milling cutter for machining work pieces, having at least one cutting insert which can conceivably be fixed in a recess of a tool base and which can be adjusted by means of an adjusting element, in which a one-piece adjusting element, having an adjusting cone extending between a screw head and a threaded shank, interacts with a conical recess formed into a lateral face of the cutting insert. For this purpose, a one-piece adjusting element with a conical screw-head portion or screw-shank portion is provided. The latter merges on the one hand into a cylindrical screw head and, on the other hand, into a threaded shank provided with a fine thread.

The adjusting cone extending between the screw head and the threaded shank and tapering towards a threaded shank conceivably interacts with the conical recess formed into a lateral face of the cutting insert, facing the adjusting element, when the cutting insert is fine-adjusted or set. In a desired position according to at least one embodiment, a surface contact exists between the adjusting cone of an adjusting element, which in the following is also referred to as a cone-fit screw, and the conical recess formed in the cutting insert.

The screw head of the cone-fit screw is guided in the cylindrical opening or guiding area of the adjusting hole formed into the tool base at a distance from the corresponding cutting insert and is located therewith positive fit. The axis of the adjusting hole is inclined towards the axis of the clamping-screw hole for the cutting insert, according to at least one possible embodiment, at an angle smaller than 40°, for example from 10° to 30°, such as 12°. Through this inclined hole axis and, consequently, through the corresponding inclination of the cone-fit screw guided in the adjusting hole, it is achieved that the adjusting hole exiting in the cylindrical surface area of the tool base is formed or surrounded by material of the tool base on essentially its entire circumference, i.e. along the entire rim of the adjusting hole. In this way, a web of material remains in the area between the recess receiving the cutting insert, and the adjusting hole in the tool base, at least in the area of the head of the cone-fit screw. The width or thickness of this web of material depends on the one hand on the size of the angle of inclination of the adjusting hole to the clamping screw hole for the cutting insert and on the other hand on the angle of taper of the adjusting cone of the cone-fit screw.

According to at least one possible embodiment, the cutting insert has a longitudinal slot in the area of a passage for the clamping screw which fixes the cutting insert in the recess formed into the tool base. The longitudinal slot can be of rectilinear or curved or lentiform shape. This slot extends on both sides of the passage in a longitudinal direction of the cutting insert. According to at least one possible embodiment, in combination with a conical clamping screw, the longitudinally slotted cutting insert is expanded, when the cutting insert is fixed by means of the conical head of the clamping screw, so that the cutting insert is located in the recess with a positive and non-positive fit as well as substantially without play. In this way, it is essentially guaranteed that the centrifugal forces generated through rotation of the milling cutter are not absorbed by the clamping screw, but rather by the tool base. This is essentially guaranteed by a recess in the tool base of symmetrical or asymmetrical dovetailed design, which serves to securely hold the cutting insert. The outer profile of the cutting insert, which is adapted to the dovetailed recess and is, therefore, also dovetail-like, is configured in at least one possible embodiment with rounded interior edges.

In another possible embodiment, one of the cutting inserts arranged and distributed on the circumference of the tool base is raised as compared with the other cutting inserts, in mounted condition, protruding over the working surface of the tool base by, for example, 0.05 mm, as compared with the other cutting inserts. The raised cutting insert serves in a particularly simple and reliable manner as a marker for a first setting, the raised cutting insert constituting the first setting edge.

Further possible embodiments and developments of the milling cutter according to the present application are indicated in the dependent claims. For example, the cutting insert is provided with a chip flute or chip evacuation flute in the area of a cutting edge carried by the cutting insert in a separable or inseparable way.

At least some of the advantages achieved with at least one possible embodiment of the present application reside in the fact that the one-piece design of the adjusting element for adjusting the respective cutting insert on the tool base of a milling cutter allows a simplified and, at the same time, substantially fine or sensitive adjustment of the respective cutting edge or of the cutting insert carrying it.

The dovetailed guidance of the correspondingly conical cutting insert in a dovetailed recess in the tool base provides for a relatively precise positioning of the cutting inserts and, therefore, of the cutting edges. In addition to the positioning action, this dovetailed guidance also serves as a substantially efficient centrifugal safety device at high speeds of the milling cutter, which can in this way be increased by approximately 20% over generally standard operating speeds. Furthermore, the dovetailed guidance provides for a simplified handling of the first tipping or also of an exchange of the cutting inserts.

Thanks to the chip flutes integrated in the cutting inserts, chip deflectors executed as separate components can be essentially omitted, so that in addition to the one-piece design of the adjusting or setting device for each cutting insert, an additional reduction of the number of components can be achieved. Through the one-piece design of the adjusting element in the form of the cone-fit screw, the cutting inserts and, thus, the cutting edge, can be adjusted with relatively high precision to the micrometer by a simple turning of the cone-fit screw, which can be turned clockwise and counter-clockwise.

In addition, the number of cutting inserts and, thus, the number of cutting edges, can be increased substantially in the milling cutter according to at least one embodiment of the present application, due to the reduction of the number of components, which also results in an increase of feed and/or cutting speeds.

In another possible design, the tool base can comprise a base carrier and a supporting ring mounted on it. In this embodiment, the supporting ring is shrunk onto the base carrier. Alternatively or additionally, the supporting ring can be screwed onto the base carrier. According to one possible embodiment, the supporting ring is a steel ring, while the base carrier is made primarily of aluminum. Cutting inserts arranged with regular spacing on the circumference of the supporting ring can be fixed on the supporting ring also in a separable way, i.e. in recesses provided there.

The embodiment of the tool base with such a base carrier and with such a supporting ring, which is mounted or shrunk onto the base carrier and can possibly additionally be screwed onto the latter, is suitable for receiving essentially any cutting inserts, independently of the method of fixation and independently of the method of adjustment or adjustability of the cutting inserts and may, therefore, be an embodiment in itself.

The above-discussed embodiments of the present application will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

At least one possible embodiment of the present application is explained in greater detail below, which is illustrated in the accompanying drawings, in which.

Corresponding parts are identified with the same reference numbers in all figures.

DESCRIPTION OF EMBODIMENT OR EMBODIMENTS

Figure 1:
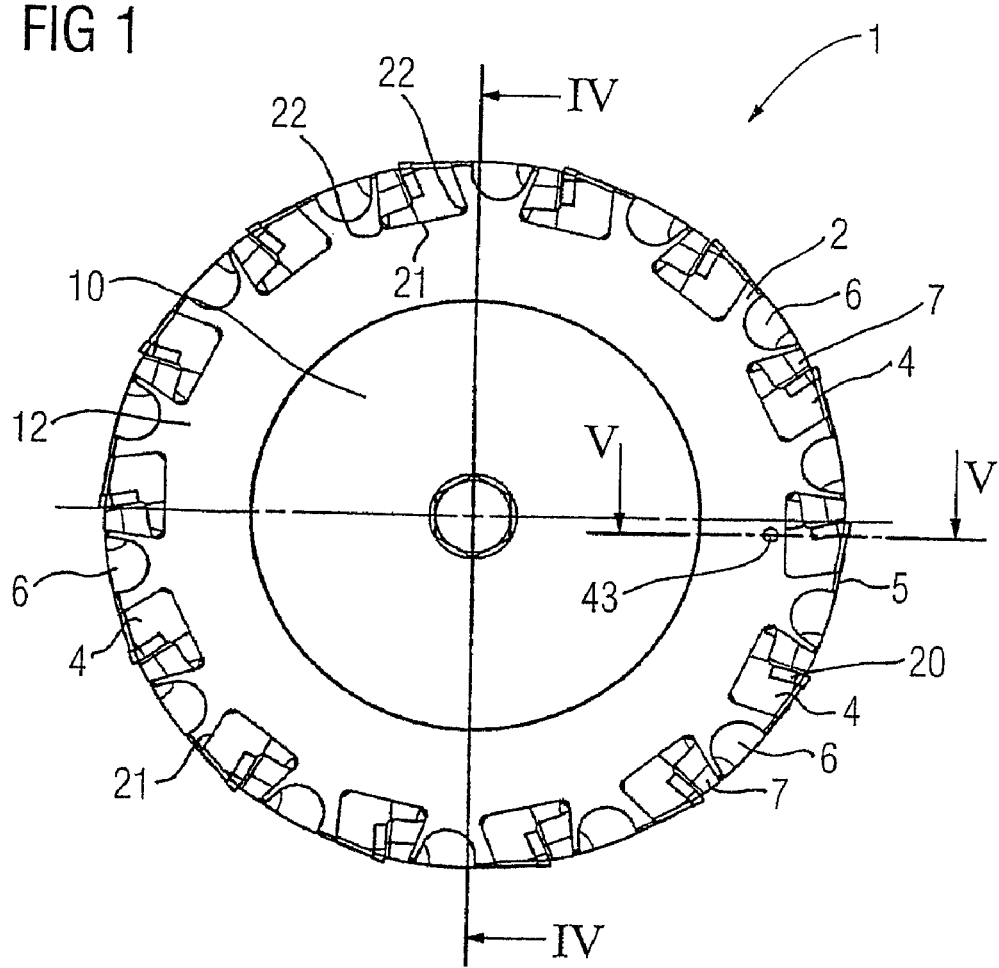
FIGS. 1 to 3 are a top view, a side view and a perspective view of a milling cutter according to at least one possible embodiment with a number of adjustable cutting inserts.
Figure 2:
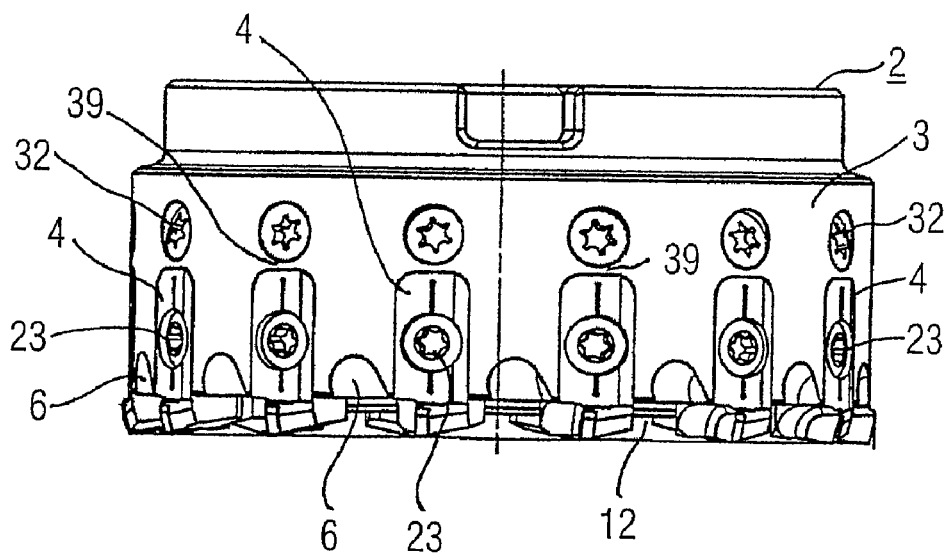
Figure 3:
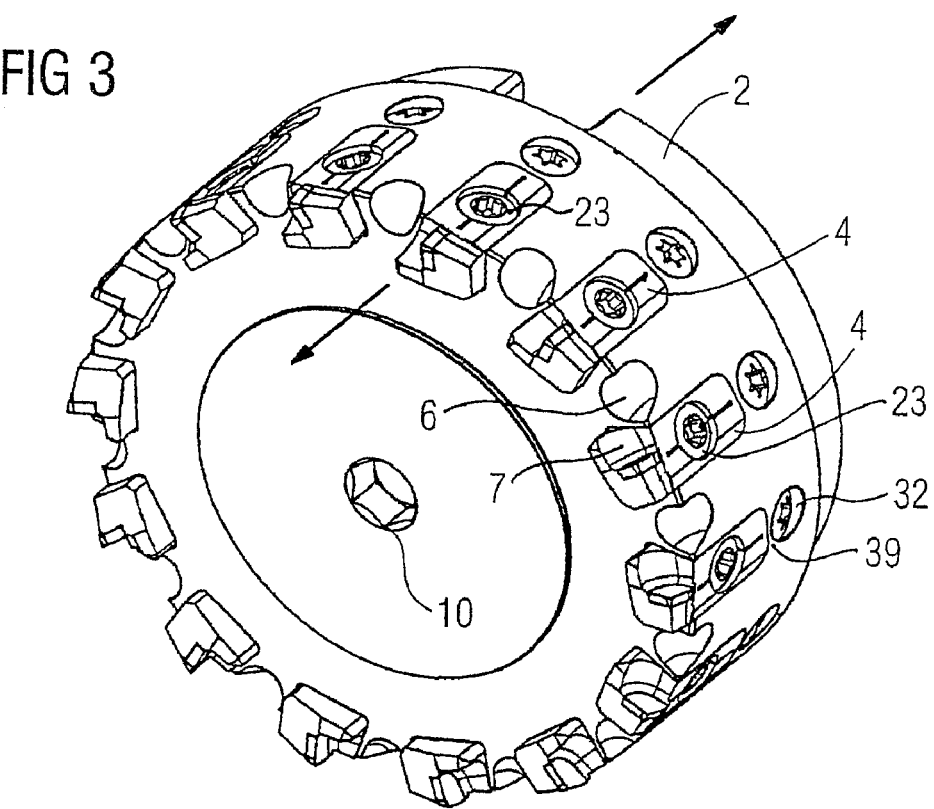
Figure 4:
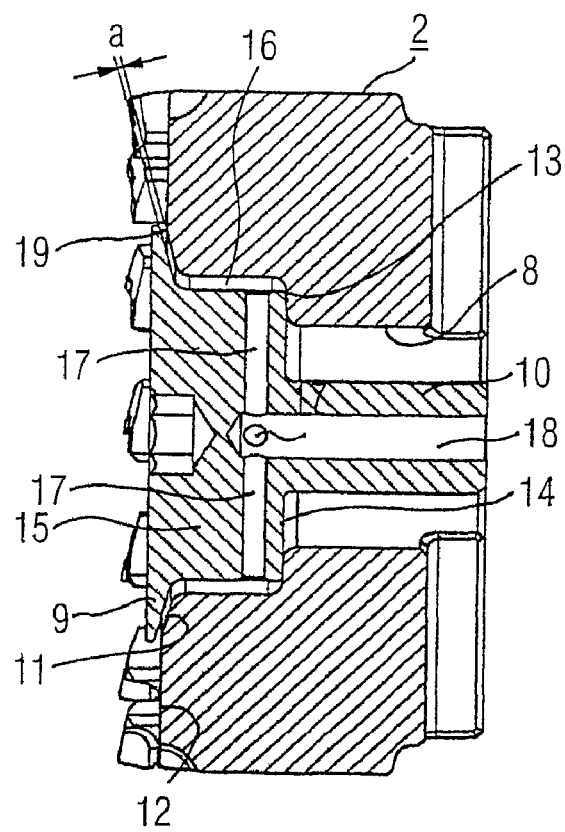
FIG. 4 is a sectional view of the milling cutter along the line IV-IV in FIG. 1.

The milling cutter 1 represented in FIGS. 1 to 3 in different views comprises a tool base 2, which has the shape of a hollow cylinder, as is apparent from FIG. 4. The material of the tool base 2 can be aluminum, titanium or steel, or possibly other suitable material.

The tool base 2 carries on its lateral surface area 3 a multitude of cutting inserts 4, which are arranged with regular spacing on the outer circumference 5 of the tool base 2. The cutting inserts 4 can also be arranged with irregular spacing on the outer circumference 5 of the tool base 2. Between the cutting inserts 4, chip-deflecting flutes 6 are formed into the tool base 2 in the area of the latter's lateral surface area 3. As is relatively clearly apparent from FIG. 3, corresponding chip flutes 7, which are integrated in each cutting insert 4, run into these chip-deflecting flutes 6.

As is apparent from FIG. 4, a central passage 8 of the tool base 2 is overlapped at its opening rim 11 by a screw collar 9 of a plate-shaped fastening screw 10 passing through the passage 8. The passage 8 runs over the opening rim 11 into the covering or working surface 12 of the tool base 2. The passage 8 is configured as a stepped hole, forming a clamping face 13 on which a corresponding collar profile 14 of a screw neck 15 abuts, forming a ring-shaped coolant channel 16. Coolant holes 17 run into this coolant channel 16, said coolant holes 17 being united in a central coolant hole 18.

During operation of the milling cutter 1, a coolant is fed through these coolant holes 17, 18 as well as through the ring-shaped coolant channel 16 to the tool or working surface 12. For this purpose, the coolant exits on the working surface 12 through a cooling gap 19 which is formed between the opening rim 11 of the passage 8 and the screw collar 9 overlapping it, and into which the coolant channel 16 runs, and, via this working surface 12, reaches the working area between cutting edges or cutting tips 20 carried by the cutting inserts 4 and the workpiece (not shown) to be machined. The width a of the cooling gap 19, according to at least one embodiment, is approximately 0.8 mm. The width a of the cooling gap 19 could be larger or smaller by tenths of a millimeter in other possible embodiments.

Instead of the central passage 8 with a separate fastening screw 10, the tool base 2 can also be executed with a one-piece adaptor shank or with a coupling.

As is relatively clearly apparent from FIG. 1, the cutting inserts 4 are guided in dovetailed recesses 21 in the tool base 2, each cutting insert 4 having an outer profile with rounded interior edges adapted to the dovetailed recess 21.

Each cutting insert 4 is fixed on the tool base 2 by means of a clamping screw 23. As is relatively clearly apparent from FIG. 6, the clamping screw 23 passes for this purpose through a corresponding clamping-screw hole 24 in the cutting insert 4. The clamping screw 23 is screwed into a clamping-screw hole 25 provided with an internal thread, in the tool base 2.

Figure 6:
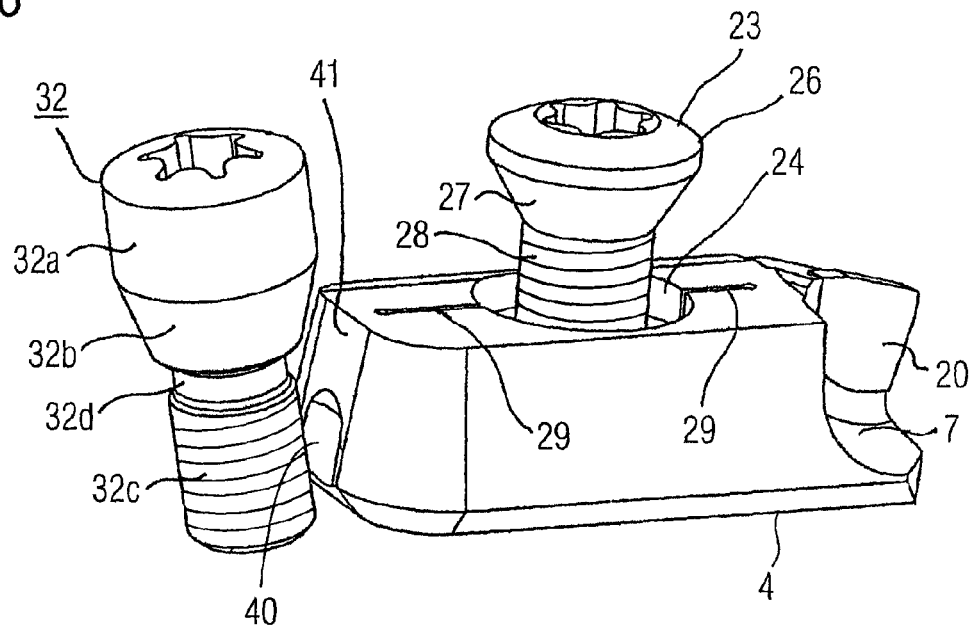
FIGS. 6 and 7 are perspective views of the adjustable cutting insert with cone-fit screw in an exploded view and in mounted condition, respectively.
Figure 7:
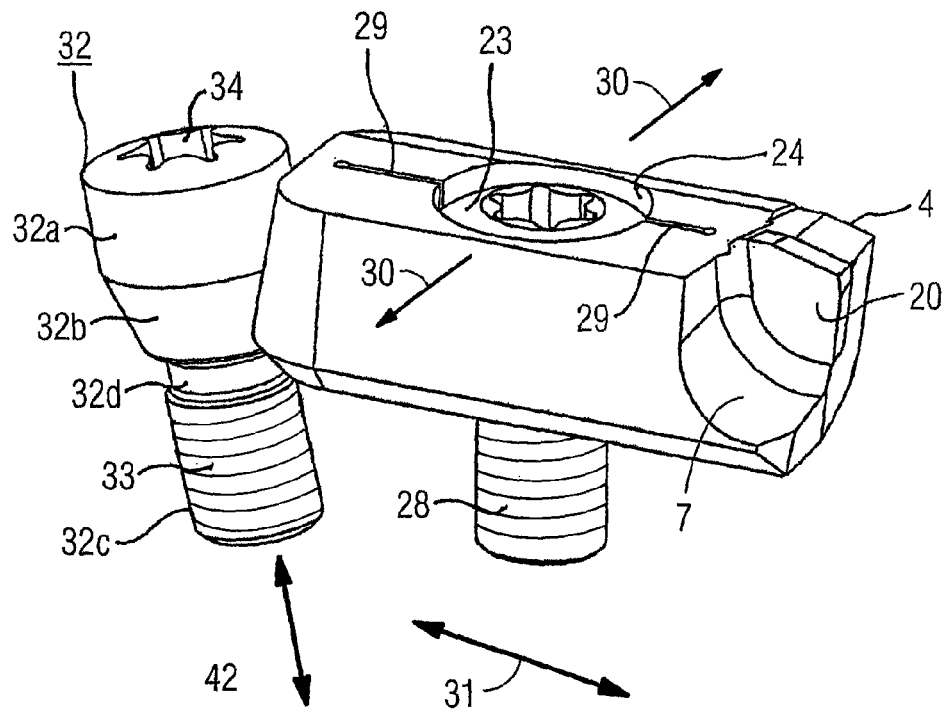

As is relatively clearly apparent from FIGS. 6 and 7, each clamping screw 23 has a conical screw head 26 whose cone 27 tapers towards the threaded shank 28 of the clamping screw 23. According to FIG. 7, the clamping screw 23 is, in the final mounted condition of the cutting insert 4, completely inserted in the passage 24 of the cutting insert 4. For an essentially secure fixing of the cutting insert 4 in the corresponding dovetailed recess 21 in the tool base 2, the cutting insert 4 is provided with a longitudinal slot 29, extending on both sides of the passage 24 of the cutting insert 4. The longitudinal slot 29 enables an expansion of the cutting insert 4 in a spreading direction 30.

When mounting the cutting insert 4 in the respective recess 21 of the tool base 2 by means of the clamping screw 23, the screw cone 27 of the clamping screw 23 expands or spreads the cutting insert 4 provided with the longitudinal slot 29, with the consequence that this cutting insert 4 is fixed essentially without play in the respective recess 21, in particular by clamping. In this way, it is essentially guaranteed that the centrifugal forces, or at least a substantial portion thereof, generated in operation through rotation of the milling cutter 1 are not absorbed by the clamping screw 23, but by the tool base 2.

The cutting insert 4 or each cutting insert 4 can be displaced in an axial direction with respect to the central, longitudinal axis of the tool base 2 in the associated recess 21 of the tool base 2 and can thus be adjusted in the desired position. Through a corresponding adjustment of the cutting insert 4, the cutting edge 20 fixed on it in a separable or inseparable way is brought into the desired position of contact with the workpiece to be machined, the adjustment or setting of the cutting insert being effected by means of a one-piece adjusting element hereinafter referred to as cone-fit screw 32.

The cone-fit screw 32 includes a cylindrical screw head or screw-head portion 32a and, adjacent to it, an adjusting cone or adjusting-cone portion 32b as well as, adjacent to the latter, a screw-shank portion 32c with an external thread 33, hereinafter referred to as threaded shank. A reduced shank portion 32d is provided on the cone-fit screw 32 between the adjusting cone 32b tapering towards the threaded shank 32c and the threaded shank 32c. The head of the cone-fit screw 32 is provided with a cross recess or a multislot recess 34 to receive a handling tool.

Figure 5:
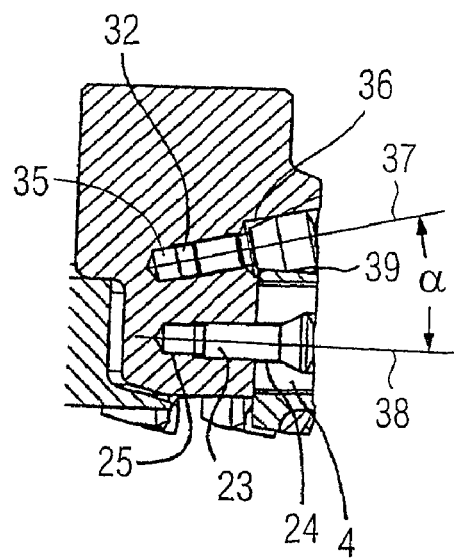
FIG. 5 is a sectional view along the line V-V in FIG. 1 of the cutting insert which is adjustable by means of a one-piece cone-fit screw.

As is relatively clearly apparent from FIG. 5, the adjusting hole 35, spaced from a recess 21 for the cutting insert 4, and the cylindrical screw-head portion 32a of the cone-fit screw 32, screwed in, in mounted condition, are located in a corresponding guidance area 36 in the tool base 2 with a positive and, therefore, essentially precise fit. The axis 37 of the adjusting hole 35 is inclined. The guidance area 36 in the tool base 2, in which the cylindrical screw-head 32 of the cone-fit screw 32 is located, is configured as a cylindrical opening area. The axis 37 and, thus, the adjusting hole 35 is inclined to the axis 38 of the clamping-screw hole 25 by an angle α which is smaller than 40°. The angle of inclination α lies, for example, between α=10° and α=30°, and may be α=12°.

With this inclination of the cone-fit screw 32, it is in particular achieved that there is a web 39 of material in the area between the recess 21 for each cutting insert 4 and the adjusting hole 35 in the surface area 3 of the tool base 2, which is relatively apparent in particular from FIG. 2. In this way, the cone-fit screw 32 lies in the tool base 2, spaced from the cassette recess 21, with a positive fit and, therefore, with an essentially precise fit.

In the adjustment position of the cone-fit screw 32 shown in FIG. 7, the adjusting cone 32b of the cone-fit screw 32 lies in a conical recess 40 in the lateral face 41, facing towards the cone-fit screw 32, of the cutting insert 4. In this adjustment position or essentially ideal position, a full-surface contact or surface contact of the adjusting cone 32b in the conical recess 40 is established. The conical recess 40 on the cutting insert or on the cutting-insert cassette 4 has a full-surface contact or surface contact with the conical face or the adjusting cone 32b of the cone-fit screw 32. When the cone-fit screw 32 is turned to the right or to the left or is fine-adjusted, it will move in a radial direction 42 with respect to the longitudinal axis of the tool base or body 2 inside the adjusting hole 30, with the consequence that the cutting insert 4 and the cutting edge 20 carried by it is moved or adjusted in axial direction 31.

The one-piece design of the adjusting element in the form of the cone-fit screw 32 allows to achieve a particularly fine adjustment, to the micrometer, of the cutting insert 4 and the cutting edge 20 carried by it. For this particularly precise adjustability of the cutting insert 4, particularly few components are needed. As, furthermore, the cutting insert 4 itself is already provided with a chip flute 7 in the area of each cutting edge 20, the number of components is further reduced. Altogether, this results in that the milling cutter 1, which can be used as a surface milling cutter, can be provided with a relatively large number of cutting inserts 4.

In one possible embodiment, one of the cutting inserts 4 arranged and distributed on the circumference 5 of the tool base 2 is raised as compared with the other cutting inserts 4, in mounted condition, such that the raised cutting insert 4 protrudes over the working surface 12 of the tool base 2 by approximately 0.05 mm as compared with the other cutting inserts 4. The raised cutting insert 4, identified by a marker 43 on the working surface 12, serves in a relatively simple manner as a marker for a first setting, which raised cutting insert 4 constitutes the first setting edge.

Figure 8:
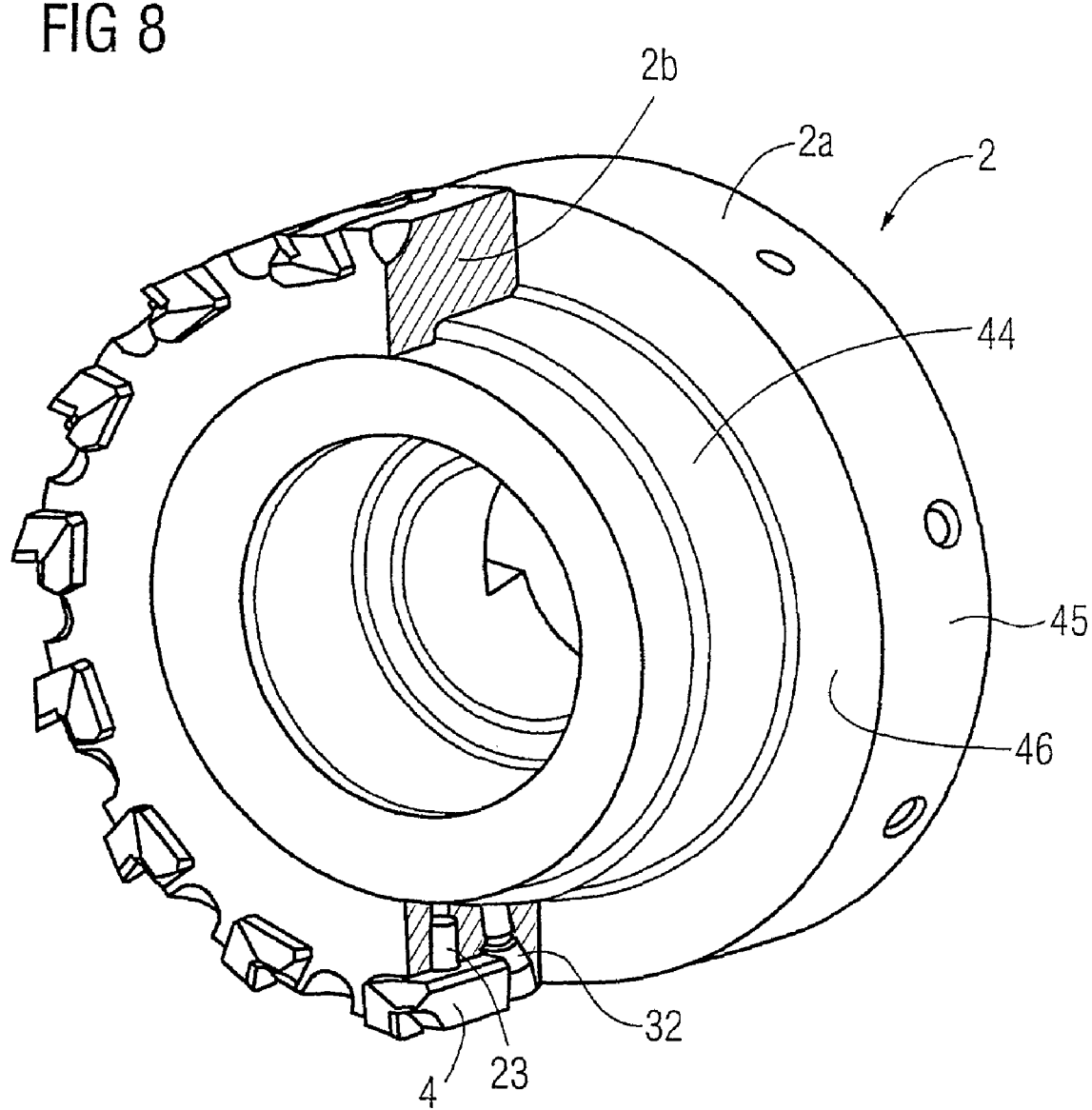
FIGS. 8 and 9 are a perspective and partly sectional view and a sectional view of a two-piece tool base with a base carrier and a supporting ring mounted on it for receiving a number of cutting inserts.
Figure 9:
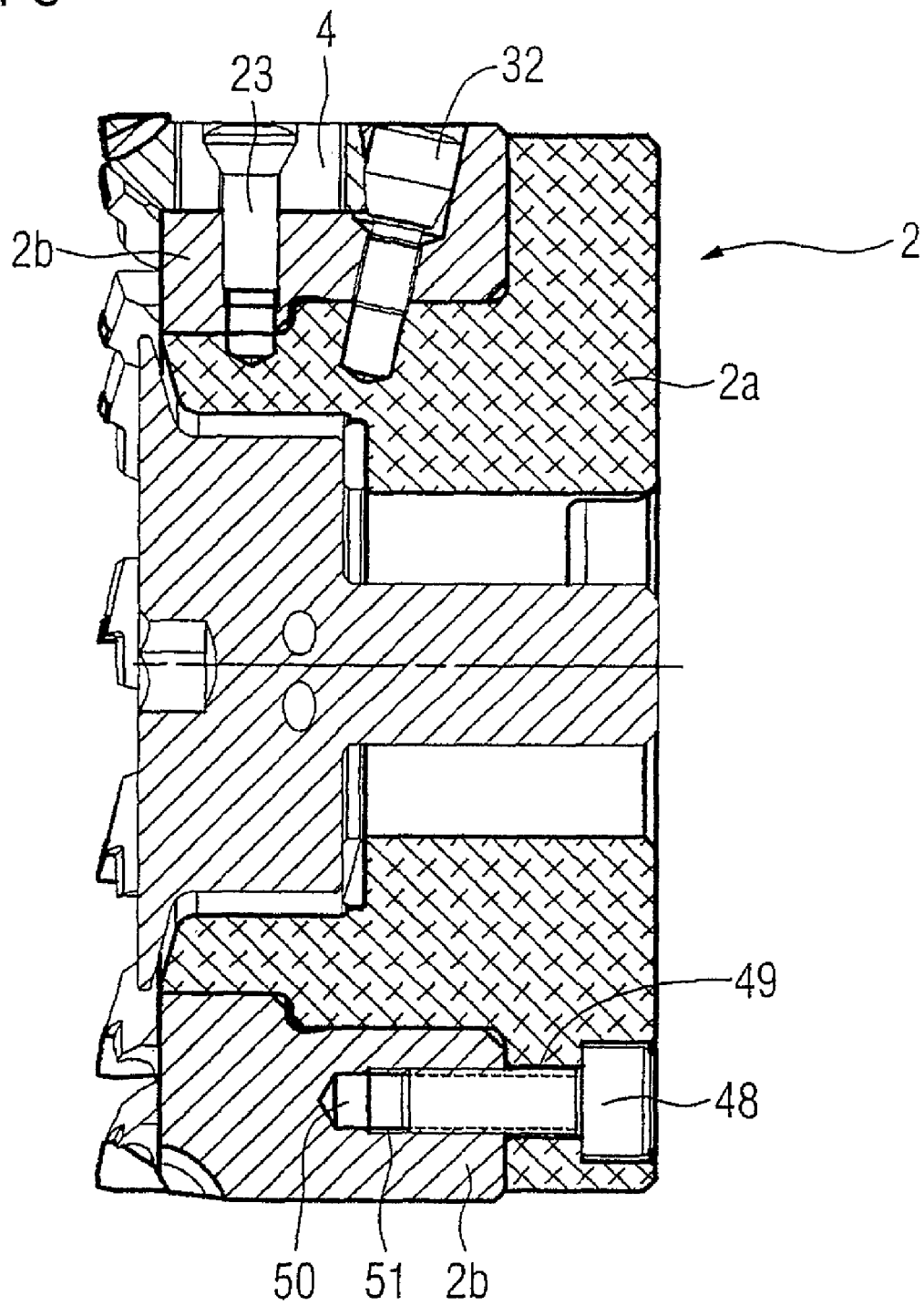

FIGS. 8 and 9 show a two-piece tool base 2 with a base carrier 2a and a supporting ring 2b. The cross-section of the base carrier 2a is approximately T-shaped, forming a cylindrical supporting shank 44 and a collar-like bearing or supporting ring 45 integrally connected with it. The cross-section of the supporting ring 2b is approximately L-shaped. The base carrier 2a comprises aluminum or other suitable material. The supporting ring 2b is a steel ring or ring made of another suitable material.

The supporting ring 2b is mounted on the shank 44 of the base carrier 2a. In the mounted position illustrated, the supporting ring 2b abuts with surface contact on the front face 46 of the bearing ring or supporting ring 45 of the base carrier 2a. The shank 44 of the base carrier 2a is adapted to the L-shaped profile of the supporting ring 2b, forming a stepped bearing or collar profile 47.

The supporting ring 2b carries on its circumference the cutting inserts 4, which are distributed with a uniform or regular spacing on the circumference of the supporting ring 2b. The clamping screws 23 fastening the cutting inserts 4 on the tool base 2, in at least one embodiment, only extend into the supporting ring 2b, so that the cutting inserts 4 are only held on the supporting ring 2b. However, these clamping screws 23 may also penetrate the supporting ring 2b and extend up to and into the base carrier 2a. Analogously, the adjusting elements or cone-fit screws 32 are only screwed into the supporting ring 2b. However, they can also extend up to and into the base carrier 2a.

The supporting or steel ring 2b is shrunk onto the base carrier 2a and there, in at least one embodiment, onto its shank 44. Additionally or alternatively, the supporting ring 2b can be screwed onto the base carrier 2a. In this respect, FIG. 9 shows an axially extending fixing screw 48 which passes through a passage 49 in the base carrier 2a and is screwed together, by means of its threaded shank 50, with an internal hole 51, having an internal thread 51, in the supporting ring 2b. Instead of a single fixing screw 48, several such fixing screws 48 can be provided for additional or alternative fastening of the supporting ring 2b on the base carrier 2a.

This application relates to a milling cutter (1) for machining work pieces, which comprises at least one cutting insert (2), fixed in a recess (21) of the tool base (2) and adjusted by means of an adjusting element (32). Said adjusting element (32) is configured as a one-piece element having an adjusting cone (32b) that extends between a screw head (32a) and a threaded shank (32c). Said adjusting cone (32b) interacts with a conical recess (40) provided in a lateral face (41) of the cutting insert (4).

One feature or aspect of an embodiment is believed at the time of the filing of this patent application to possibly reside broadly in a milling cutter 1 for machining workpieces, having at least one cutting insert 4 which can be fixed in a recess 21 of a tool base 2 and which can be adjusted by means of an adjusting element 32, characterized by a one-piece adjusting element 32, having an adjusting cone 32b extending between a screw head 32a and a threaded shank 32c, which interacts with a conical recess 40 formed into a lateral face 41 of the cutting insert 4.

Another feature or aspect of an embodiment is believed at the time of the filing of this patent application to possibly reside broadly in the milling cutter, wherein an adjusting hole 35 spaced from the recess 21 for the cutting insert 4 and having an internal thread corresponding with the threaded shank 32c of the adjusting element 32 and having a cylindrical opening area 36, in which the screw head 32a of the adjusting element 32 is guided.

Yet another feature or aspect of an embodiment is believed at the time of the filing of this patent application to possibly reside broadly in the milling cutter, wherein the axis 37 of the adjusting hole 35 is inclined to the axis 38 of a clamping-screw hole 25 for the cutting insert 4.

Still another feature or aspect of an embodiment is believed at the time of the filing of this patent application to possibly reside broadly in the milling cutter, wherein the inclination α of the axis 37 of the adjusting hole 35 lies between α>0° and α<40°, expediently α=20±10°, preferably α=12°.

A further feature or aspect of an embodiment is believed at the time of the filing of this patent application to possibly reside broadly in the milling cutter, wherein the adjusting element 32 has a reduced shank portion 32d between the adjusting cone 32b and the threaded shank 32c.

Another feature or aspect of an embodiment is believed at the time of the filing of this patent application to possibly reside broadly in the milling cutter, wherein the cutting insert 4 is provided in the area of a passage 24 with a longitudinal slot 29 for a clamping screw 23.

Yet another feature or aspect of an embodiment is believed at the time of the filing of this patent application to possibly reside broadly in the milling cutter, wherein a conical clamping screw 23 for fixing the cutting insert 4 in the recess 21 of the tool base 2.

Still another feature or aspect of an embodiment is believed at the time of the filing of this patent application to possibly reside broadly in the milling cutter, wherein a chip flute 7 is integrated in the cutting insert 4 in the area of a cutting edge 20 carried by the cutting insert 4.

A further feature or aspect of an embodiment is believed at the time of the filing of this patent application to possibly reside broadly in the milling cutter, wherein a dovetailed recess 21 in the tool base 2 for receiving the cutting insert 4.

Another feature or aspect of an embodiment is believed at the time of the filing of this patent application to possibly reside broadly in the milling cutter, wherein the cutting insert 4 has an external profile with rounded interior edges 22 adapted to the dovetailed recess 21.

Yet another feature or aspect of an embodiment is believed at the time of the filing of this patent application to possibly reside broadly in the milling cutter, wherein a cutting insert 4 which in mounted condition is raised over the working surface 12 of the tool base 2, as compared with any other cutting insert 4.

Still another feature or aspect of an embodiment is believed at the time of the filing of this patent application to possibly reside broadly in the milling cutter, wherein the tool base 2 has a central passage 8 with a clamping face 13 on which a corresponding collar profile 14 of a screw neck 15 of a plate-shaped fastening screw 10 abuts, forming a ring-shaped coolant channel 16, which runs into a cooling gap 19 formed between the opening rim 11 of the passage 10 and a screw collar 9 overlapping it.

A further feature or aspect of an embodiment is believed at the time of the filing of this patent application to possibly reside broadly in the milling cutter, wherein the tool base 2 comprises a base carrier 2a and a supporting ring 2b mounted on it, on which the cutting insert 4 can be fixed.

Another feature or aspect of an embodiment is believed at the time of the filing of this patent application to possibly reside broadly in the milling cutter, wherein the supporting ring 2a is shrunk onto the base carrier 2a.

Yet another feature or aspect of an embodiment is believed at the time of the filing of this patent application to possibly reside broadly in the milling cutter, wherein the supporting ring 2b is screwed together with the base carrier 2a.

Still another feature or aspect of an embodiment is believed at the time of the filing of this patent application to possibly reside broadly in the milling cutter, wherein the base carrier 2a is made of aluminum.

A further feature or aspect of an embodiment is believed at the time of the filing of this patent application to possibly reside broadly in the milling cutter, wherein the supporting ring 2b is a steel ring.

What is claimed is:

1. A rotary milling cutter for machining workpieces comprising:
   a substantially circular milling cutter base body being configured to be rotated about a rotational axis;
   said milling cutter base body comprising a plurality of recesses disposed at intervals around the periphery thereof;
   a plurality of cutting insert cartridges being detachably connected to said milling cutter base body;
   each of said cutting insert cartridges being disposed in a corresponding recess in said milling cutter base body;

a plurality of adjusting screws;
said milling cutter base body comprising a plurality of adjusting holes, each being configured to receive and retain a corresponding adjusting screw;
said plurality of recesses comprising a first recess, said plurality of cutting insert cartridges comprising a first cutting insert cartridge, said plurality of adjusting screws comprising a first adjusting screw, and said plurality of adjusting holes comprising a first adjusting hole;
said first adjusting screw comprising:
a screw head portion;
a threaded shank portion; and
a conical portion being disposed between said screw head portion and said threaded shank portion;
said first cutting insert cartridge comprising a conical adjustment surface; and
said conical portion of said first adjusting screw being configured and disposed to matingly engage with said conical adjustment surface of said first cutting insert cartridge to move said first cutting insert cartridge linearly;
said screw head portion of said first adjusting screw comprises a cylindrical screw head portion;
said first adjusting hole comprises a cylindrical portion disposed at the outer surface of said milling cutter base body;
said cylindrical portion is formed by said milling cutter base body and is spaced apart from said first recess by a web portion of said milling cutter base body; and
said cylindrical screw head portion of said first adjusting screw is configured to matingly engage with said cylindrical portion of said first adjusting hole to minimize play therebetween.

2. The milling cutter according to claim 1, wherein said first adjusting screw and said first cutting insert cartridge are configured to permit micrometer adjustment of the position of said first cutting insert cartridge in said milling cutter base body.

3. The milling cutter according to claim 2, wherein:
the milling cutter comprises a plurality of clamping screws insert cartridges to said base body;
each of said cutting insert cartridges has a hole disposed therein configured to permit a corresponding clamping screw to pass therethrough;
said base body comprises a plurality of clamping holes, each disposed in a corresponding recess;
each of said clamping holes is configured and disposed to receive and retain a corresponding clamping screw;
said clamping holes comprise a first clamping hole;
the axis of said first adjusting hole is inclined with respect to the axis of said first clamping hole; and
the inclination of the axis of said first adjusting hole is between >0° and <40°.

4. The milling cutter according to claim 3, wherein:
the inclination of the axis of said first adjusting hole is 20°±10°;
said first adjusting screw comprises a reduced shank portion between said conical portion and said threaded portion;
each of said cutting insert cartridges comprises two longitudinal slot portions extending opposite one another away from the hole in each of said cutting insert cartridges;
each of said cutting insert cartridges comprises a cutting edge and a chip flute disposed in the area of the cutting edge;

said first recess in said base body comprises a dovetailed recess; and
said first cutting insert cartridge has an external profile with rounded interior edges adapted to said first dovetailed recess;
said base body has a central passage with a clamping face on which a corresponding collar profile of a screw neck of a plate-shaped fastening screw abuts, forming a ring-shaped coolant channel which runs into a cooling gap formed between the opening rim of the passage and a screw collar overlapping it;
said base body comprises a base carrier and a supporting ring mounted on it, on which said cutting insert cartridges are mounted;
the supporting ring is shrunk onto the base carrier;
the supporting ring is screwed together with the base carrier;
the base carrier is made of aluminum; and
the supporting ring is a steel ring.

5. A milling cutter for machining workpieces comprising:
a milling cutter base body;
at least a first cutting insert cartridge being detachably connected to said milling cutter base body;
at least a first adjusting screw;
said first adjusting screw comprising:
a screw head portion;
a threaded shank portion; and
a conical portion being disposed between said screw head portion and said threaded shank portion;
said first cutting insert cartridge comprising a conical adjustment surface; and
said conical portion of said first adjusting screw being configured and disposed to matingly engage with said conical adjustment surface of said first cutting insert cartridge to move said first cutting insert cartridge linearly;
said screw head portion of said first adjusting screw comprises a cylindrical screw head portion;
said first adjusting hole comprises a cylindrical portion disposed at the outer surface of said milling cutter base body;
said cylindrical portion is formed by said milling cutter base body and is spaced apart from said first recess by a web portion of said milling cutter base body; and
said cylindrical screw head portion of said first adjusting screw is configured to matingly engage with said cylindrical portion of said first adjusting hole to minimize play therebetween.

6. The milling cutter according to claim 5, wherein said first adjusting screw and said first cutting insert cartridge are configured to permit micrometer adjustment of the position of said first cutting insert cartridge in said milling cutter base body.

7. The milling cutter according to claim 5, wherein:
the milling cutter comprises a plurality of clamping screws configured to clamp said cutting insert cartridges to said milling cutter base body;
each of said cutting insert cartridges has a hole disposed therein configured to permit a corresponding clamping screw to pass therethrough;
said milling cutter base body comprises a plurality of clamping holes, each disposed in a corresponding recess in said milling cutter base body;
each of said clamping holes is configured and disposed to receive and retain a corresponding clamping screw;
said clamping holes comprise a first clamping hole;

the axis of said first adjusting hole is inclined with respect to the axis of said first clamping hole; and the inclination of the axis of said first adjusting hole is between >0° and <40°.

8. The milling cutter according to claim 7, wherein:

the inclination of the axis of said first adjusting hole is 20°±10°;

said first adjusting screw comprises a reduced shank portion between said conical portion and said threaded portion;

each of said cutting insert cartridges comprises two longitudinal slot portions extending opposite one another away from the hole in each of said cutting insert cartridges;

each of said cutting insert cartridges comprises a cutting edge and a chip flute disposed in the area of the cutting edge;

said first recess in said base body comprises a dovetailed recess; and said first cutting insert cartridge has an external profile with rounded interior edges adapted to said first dovetailed recess;

said milling cutter base body has a central passage with a clamping face on which a corresponding collar profile of a screw neck of a plate-shaped fastening screw abuts, forming a ring-shaped coolant channel which runs into a cooling gap formed between the opening rim of the passage and a screw collar overlapping it;

said milling cutter base body comprises a base carrier and a supporting ring mounted on it, on which said cutting insert cartridges are mounted;

said supporting ring is connected to said base carrier by one of: a shrink fit and screws;

the base carrier is made of aluminum; and the supporting ring is a steel ring.

9. The milling cutter according to claim 7, wherein the inclination of the axis of said first adjusting hole is 12°.

10. The milling cutter according to claim 5, wherein said first adjusting screw is configured to move said first cutting insert cartridge linearly substantially parallel to the axis of rotation of said milling cutter.

11. A milling cutter for machining workpieces comprising:

a milling cutter base body;

a cutting insert cartridge being detachably connected to said milling cutter base body;

a adjusting screw;

said adjusting screw comprising:

a screw head portion;

a threaded shank portion; and a conical portion being disposed between said screw head portion and said threaded shank portion;

said first cutting insert cartridge comprising a conical adjustment surface; and said conical portion of said adjusting screw being configured and disposed to matingly engage with said conical adjustment surface of said cutting insert cartridge to linearly move said cutting insert cartridge; and said milling cutter base body has a central passage with a clamping face on which a corresponding collar profile of a screw neck of a plate-shaped fastening screw abuts, forming a ring-shaped coolant channel which runs into a cooling gap formed between the opening rim of the passage and a screw collar overlapping it.

12. The milling cutter according to claim 11, wherein said conical portion of said adjusting screw is configured to provide micrometer adjustment of the position of said cutting insert cartridge in said milling cutter base body.

13. The milling cutter according to claim 12, further comprising a clamping screw configured to milling cutter base body;

said cutting insert cartridge has a hole disposed therein configured to permit said clamping screw to pass therethrough; and said cutting insert cartridge comprises two longitudinal slot portions extending opposite one another away from the hole to permit expansion of said cutting insert cartridge upon insertion of said clamping screw therein to clamp said cutting insert cartridge in a recess in said milling cutter base body.

14. The milling cutter according to claim 13, wherein:

said screw head portion of said adjusting screw comprises a cylindrical screw head portion configured to matingly engage with a cylindrical portion of an adjusting hole in said milling cutter base body;

said adjusting screw comprises a reduced shank portion between said conical portion and said threaded portion;

said cutting insert cartridge comprises a cutting edge and a chip flute disposed in the area of the cutting edge; and said cutting insert cartridge has an external profile with rounded interior edges configured to match a dovetailed recess in a milling cutter base body.

* * * * *